No. 733,430. Patented July 14, 1903.

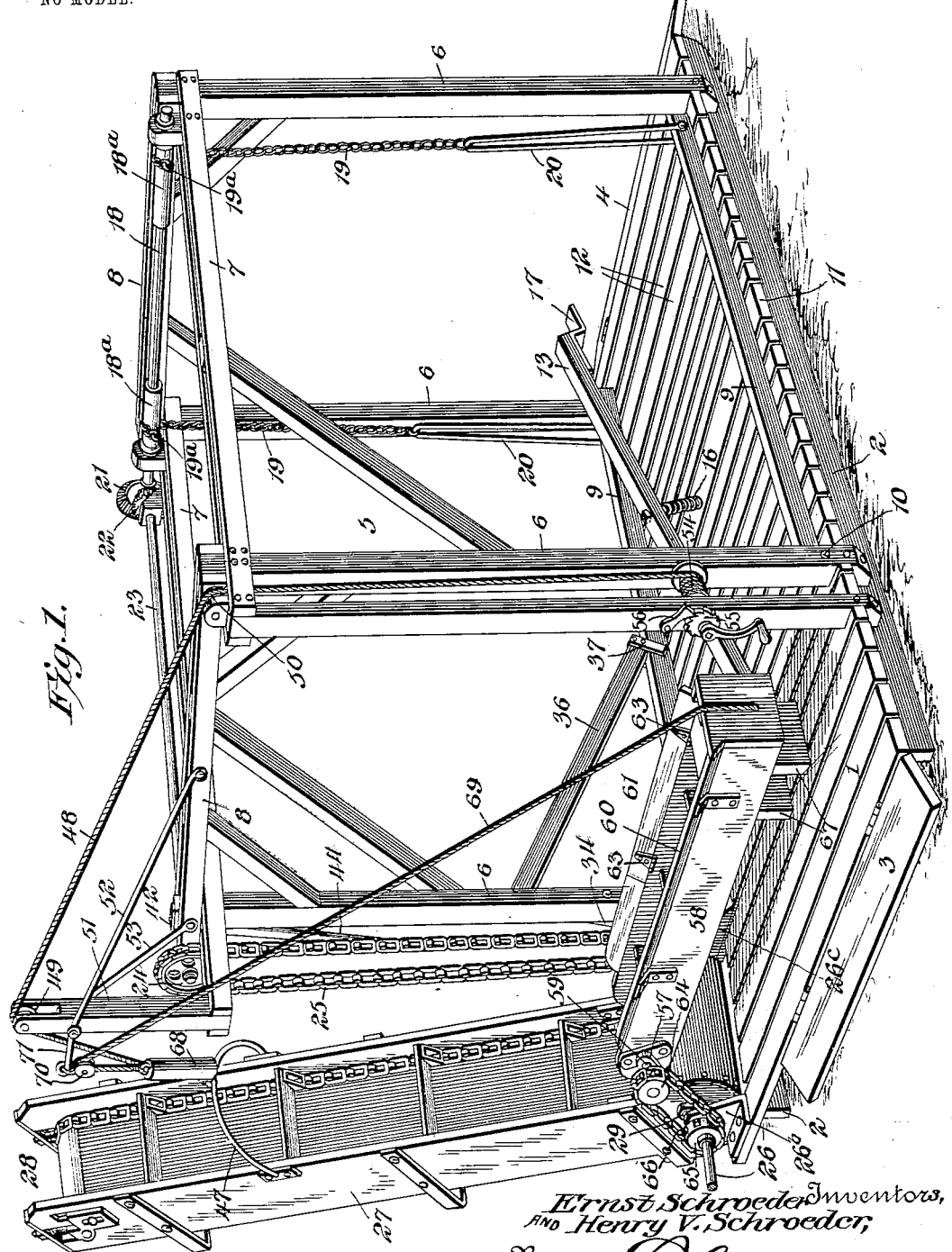

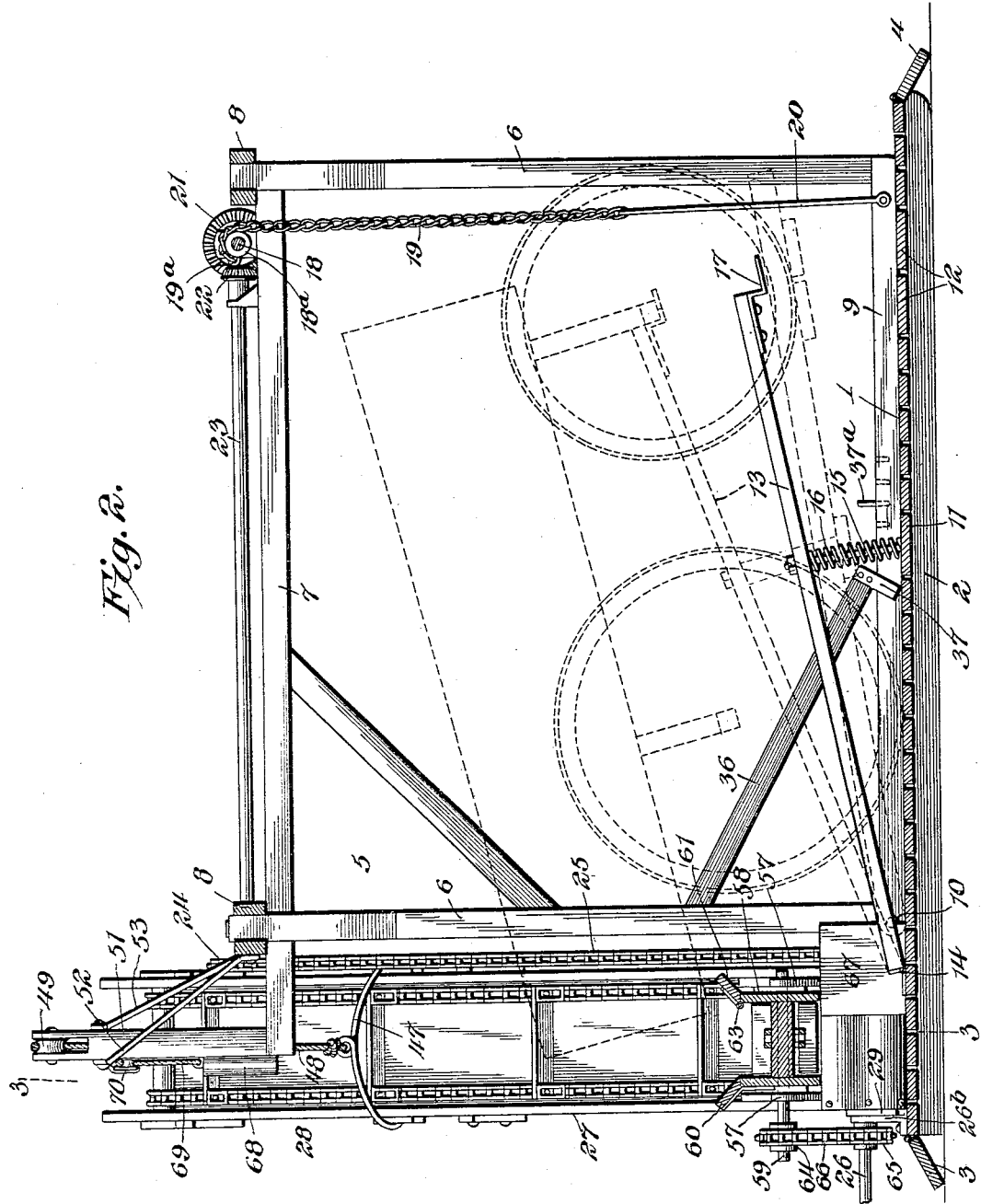

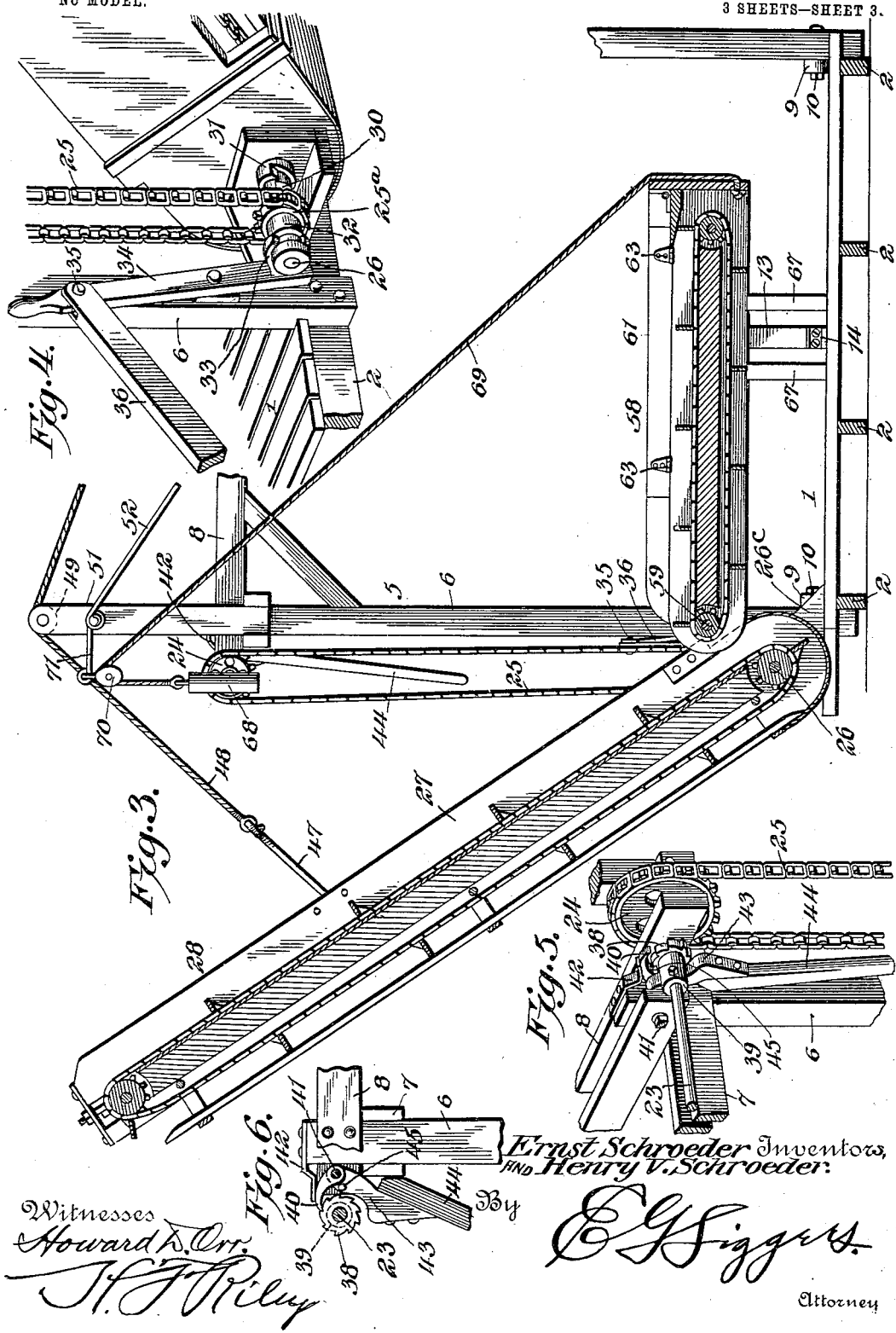

UNITED STATES PATENT OFFICE.

ERNST SCHROEDER AND HENRY V. SCHROEDER, OF MINIER, ILLINOIS.

PORTABLE GRAIN DUMP AND ELEVATOR.

SPECIFICATION forming part of Letters Patent No. 733,430, dated July 14, 1903.

Application filed January 9, 1903. Serial No. 138,396. (No model.)

*To all whom it may concern:*

Be it known that we, ERNST SCHROEDER and HENRY V. SCHROEDER, citizens of the United States, residing at Minier, in the county of Tazewell and State of Illinois, have invented a new and useful Portable Grain Dump and Elevator, of which the following is a specification.

This invention relates to improvements in portable grain dumps and elevators.

The object of the present invention is to improve the construction of the portable grain dump and elevator shown and described in Patent No. 668,461, granted to us February 19, 1901, more especially the gearing for raising the dump, and to provide simple and efficient means for controlling the downward movement of the same to permit a wagon-body to be slowly lowered to a horizontal position after the same has been raised to an inclined position for dumping and the operation of dumping completed.

A further object of the invention is to improve the construction of the mechanism for automatically stopping the dump at the desired elevation and to provide a simple, inexpensive, and efficient device adapted to be readily set or arranged for automatically throwing the hoisting-gear out of operation when the wagon is raised to the desired elevation.

With these and other objects in view the invention consists in the novel construction and arrangement of parts hereinafter fully described, illustrated in the accompanying drawings, and particularly pointed out in the claims hereto appended, it being understood that changes in the form, proportion, and minor details of construction within the scope of the claims may be made without departing from the spirit or sacrificing any of the advantages of the invention.

In the drawings, Figure 1 is a perspective view of a portable grain dump and elevator constructed in accordance with this invention. Fig. 2 is a vertical longitudinal sectional view of the same. Fig. 3 is a transverse sectional view on the line 3 3 of Fig. 2. Fig. 4 is a detail perspective view of the clutch mechanism for throwing the dump-hoisting gearing out of operation when the dump has reached the desired elevation. Fig. 5 is a detail perspective view of the brake mechanism for controlling the descent of the dump. Fig. 6 is a vertical sectional view of the same.

Like numerals of reference designate corresponding parts in all the figures of the drawings.

1 designates a platform supported upon low runners 2 to enable it to be readily drawn from place to place and to permit the platform to be arranged close to the ground. The platform is provided at its ends with hinged skids 3 and 4, by means of which a wagon may be readily driven onto and off of the platform. Above the platform is a suitable frame 5, composed of vertical corner posts or studs 6 and longitudinally and transversely disposed bars 7 and 8, connecting the upper ends of the posts 6. The posts and the bars are suitably braced, and the latter are arranged at a suitable elevation to enable a wagon to be readily driven under the same and to permit the front end of the wagon to be elevated for arranging the wagon-bed at an inclination to discharge its contents without the wagon coming in contact with the top of the frame.

Disposed longitudinally of the platform, at opposite sides thereof and immediately within the corner-posts, are bars 9, which are pivoted to the posts near one end of the platform at 10. The bars 9 are connected together at a suitable distance from their inner ends by a board 11 and are connected together near their outer ends by boards 12. The boards 11 and 12 when the bars 9 are lowered to their horizontal position constitute portions of the platform and are arranged in the same plane as the rest of the platform. The boards 11 and 12, together with the bars 9, constitute the dump by means of which the front end of a loaded wagon may be elevated to incline the wagon-body and discharge the load therefrom. The distance between the boards 11 and 12 is such that when the front wheels of a wagon rest upon the boards 12 the board or cross-bar 11 is immediately in advance of the rear wheels, so that when the dump is raised by the means hereinafter described the boards or bars 12 in ascending elevate the front wheels and the front end of the wagon, while the board or cross-bar 12 rises immediately in advance of the rear wheels and forms a chock which by bearing against the front portions of the rims of the rear wheels prevents the wagon from being drawn forward while the same is being tilted. The dump is provided with a chock-bar 13, arranged longitudinally of the center of it and pivoted at its inner end to the platform at 14 and connected between its ends to the board or cross-bar 11 by a bolt-rod 15, which permits vertical movement or oscillation of the chock-bar. A coiled spring 16 is placed on the bolt-rod between the chock-bar and the board or cross-bar 11 to hold the chock-bar normally elevated. The chock-bar is provided at its outer end with a hook-plate 17, located above the boards or bars 12 and arranged to engage the front axle of a wagon. When a wagon is driven onto the platform, the running-gear thereof overrides the chock-bar 13 and depresses the outer free end thereof against the tension of the spring 16. When the front axle clears the free end of the chock-bar, the latter will be thrown upward by the spring 16, which carries the hook-plate 17 into engagement with the front axle, thereby preventing the wagon from backing or moving rearward while it is being raised or lowered. The chock-bar 13 and the cross-bar 11 of the dump coöperate to prevent a wagon from moving either forward or rearward after the same has reached the proper position for tilting and while the same is being tilted.

The construction previously described is the same as that shown and described in the said patent. Coming now to the present invention, a drum-shaft 18 is disposed transversely of the frame 5 and is journaled in suitable bearings at the outer end thereof adjacent to the outer transverse bars 8, as clearly shown in Figs. 1 and 2 of the drawings. The drum-shaft, which has suitable enlargements or drums 18$^a$, is provided with hoisting-chains 19 or other flexible connections attached at their upper ends to the drums or enlargements of the shaft 18 by means of eyebolts 19$^a$, passing through the drums and the shaft and provided with eyes which are linked into the upper ends of the chains. The hoisting-chains, which are adapted to be wound around the drum when the shaft 18 is rotated, are connected with the outer ends of the bars 9 by means of rods 20 doubled, as clearly shown in Fig. 1, and provided at their terminals with eyes which are located at opposite sides of the bars 9 and which are pivoted to the same by suitable fastening devices.

The transverse shaft 18 has keyed or otherwise secured to it a bevel gear-wheel 21, which meshes with a beveled pinion 22 of a longitudinal shaft 23, journaled in suitable bearings and located at one side of the frame 5 at one side of the top thereof. The beveled gears 21 and 22 are located at the outer end of the longitudinal shaft 23, which is provided at its inner end with a sprocket-wheel 24. The sprocket-wheel 24 is connected by a sprocket-chain 25 with a sprocket-pinion 25$^a$ of a shaft 26, which is journaled in suitable bearings of brackets 26$^b$ and 26$^c$. The shaft 26 passes transversely through the lower end of a trough or housing 27 of an elevator 28. The trough or housing 27 is pivoted on the shaft 26 and has bearing-plates 29 secured on the outer sides of said trough or housing and provided with openings through which the shaft 26 extends. The shaft 26 may be driven by any suitable means, a suitable horse-power being usually employed for this purpose. The sprocket-pinion 25$^a$, which is provided on its interior with a suitable key or feather to fit in a groove or way of the shaft 26, has a clutch member 30 at its inner end for engaging a clutch member 31 of the shaft 26, whereby when the two clutch members are in engagement with each other motion will be communicated to the sprocket-pinion 25$^a$ from the shaft 26 for operating the dump. The sprocket-pinion 25$^a$ is provided at its outer end with an extension 32, having an annular groove for the reception of a fork 33 of a shifting-lever 34, fulcrumed between its ends on the adjacent post 6 and provided at its upper end with a grip or handle to enable it to be readily operated by hand. The lever 34 is connected at its upper arm adjacent to the grip or handle by a pivot 35 with the upper end of an inclined operating-bar 36, located at one side of the dump, and provided at its lower end with depending flanges 37, preferably forming a cuff, as shown. The cuff, which is approximately U-shaped, embraces the lower end of the inclined operating-bar and extends downward therefrom at each side of the adjacent bar 9, whereby the lower end of the operating-bar, which is beveled or rounded, is adapted to slide on the said bar 9 as the latter swings upward and downward. The bar 9, which receives the operating-bar, is provided with a removable pin or projection 37$^a$, which is arranged to engage and actuate the operating-bar and which may be placed at any desired point on the bar 9 to stop the dump when the same reaches the desired elevation. When the projection or pin engages and actuates the operating-bar, the lever, which is connected with the upper end of the same, is oscillated and the clutch is moved outward on the shaft 26 out of engagement with the clutch member thereof, thereby throwing the gearing for hoisting the dump out of operation. The upper longitudinal shaft is also provided with a ratchet-wheel 38, keyed or otherwise secured to the shaft and provided with a central elongated hub 39, forming a cylindrical enlargement and constituting a brake wheel or member. The ratchet-wheel is normally engaged by a dog or pawl 41, which is pivoted to the frame 5 by a bolt 41 and which is engaged by a spring 42, which normally holds the pawl or dog in engagement with the ratchet-wheel. The brake wheel or member is engaged by a shoe 43 of a lever 44, which may consist of the engaging portion or shoe 43 and a separate bar or piece, as illustrated in the accompanying drawings, or be constructed in any other desired manner. The engaging portion or shoe is provided with a perforation for the reception of the bolt or pinion 41, and it has a lug or projection 45 arranged to engage the pawl or dog when the lever is thrown outward. The pawl or dog is thrown out of engagement with the ratchet-wheel by the outward movement of the lever before the shoe or engaging portion contacts with the friction wheel or member, and a further movement of the brake-lever applies the brake by causing the shoe or engaging portion to engage the brake wheel or member. By this construction the dump and a wagon may be slowly lowered to the platform.

The shaft 26 actuates the endless conveyer of the elevator trough or housing 27, which is provided with a bail 47, to which is connected an elevating rope or cable 48, which passes over sheaves 49 and 50 of the frame 5. The sheave 49 is mounted in the slot or bifurcation of an arm 51 of the frame, and the said arm 51 is supported by metal braces 52 and 53 and is mounted on extensions of the side bars 7 of one side of the frame 5. The hoisting rope or cable is connected to a suitable windlass or drum 54, mounted on the frame 5 and provided with a suitable crank-handle. The drum or windlass is held against retrograde rotation by means of a ratchet-wheel 55 and a pawl 56. By these means the elevator may be raised and lowered to any desired angle. Bearing-arms 57 are secured to the sides of the elevator-trough 27, near the lower end thereof, and project therefrom a short distance over one side of the platform to receive the adjacent end of a transverse conveyer-trough 58. The conveyer-trough 58 is pivoted at its inner end by a shaft 59, which has its bearings in the arms 57, whereby the conveyer-trough is hinged or pivotally connected to the elevator-trough and is adapted to be lowered and extended across the inner end of the platform and to be elevated and disposed out of the way of a wagon driven onto the platform and then relowered behind the wagon and disposed transversely of the rear end thereof at a point below the same, so that when the wagon is tilted its contents will be discharged into the conveyer-trough. The conveyer-trough is provided with wings 60 and 61, which extend from the upper edges of the sides thereof. The wing 60 on the outer side of the trough is rigidly secured in position. The wing 61 is secured to the side of the trough nearest the wagon by means of hinges 63, whereby the said wing 61 may be turned outwardly in the position shown in the drawings to direct the grain as the same is discharged from the wagon into the trough of the conveyer, or the said wing 61 may be folded inwardly over the bottom of the conveyer-trough.

The shaft 59 is provided with a sprocket-wheel 64, which is connected to the sprocket-wheel 65 of the shaft 26 by endless sprocket-chains 66. The shaft 59 actuates the endless conveyer-chains and forms a pintle for the conveyer. The conveyer-trough is provided with suitable supports 67, preferably mounted on the platform for holding the conveyer when the same is lowered; but the supports may be in the form of legs and be secured to the conveyer, if desired.

The transverse conveyer-trough is partially counterbalanced by a weight 68, secured to one end of a rope or cable which has its other end attached to the outer end of the conveyer-trough. The rope or cable 69 extends upward from the outer end of the conveyer-trough to a pulley 70, supported in a suitable block or casing and secured to an extension or arm 71 of the brace 52. The weight 68 enables the transverse conveyer-trough to be readily swung upward and downward, and it will support the conveyer in an elevated position while a wagon is driving past it.

It will be seen that simple and effective means of great strength and durability are provided for hoisting the dump or elevator, (the front portion of a wagon,) that the trip mechanism is automatic and may be readily set for stopping the hoisting mechanism when the dump has reached the desired elevation, and that an efficient brake is provided for controlling the descent of the dump and the wagon-body.

What we claim is—

1. In a grain dump and elevator, the combination of a frame, a dump for raising one end of a wagon, a transverse shaft journaled in suitable bearings of the frame and located above the dump, an elevator, a longitudinal shaft operated from the elevator-shaft and located at the top of the frame at one side thereof, gearing connecting the said shafts, and flexible connections attached to the dump and connected with and arranged to be wound on the transverse shaft, substantially as described.

2. In a grain dump and elevator, the combination of a frame, a dump for elevating the front end of a wagon, an elevator, a transverse shaft located above the dump and provided with drums, flexible connections attached to the dump, eyebolts passing through the drums and receiving the flexible connections, gearing for connecting the transverse shaft with the elevator, and means for automatically throwing the gearing out of operation to stop the transverse shaft, substantially as described.

3. In a grain dump and elevator, the combination of a frame, a transverse shaft mounted on the frame at the top thereof, a dump for raising the front end of a wagon-body, flexible connections arranged to be wound up by the shaft and connected with the dump, an elevator-gearing for connecting the transverse shaft with the elevator, and means for automatically throwing the gearing out of operation to stop the transverse shaft, substantially as described.

4. In a grain dump and elevator, the combination of a frame, an elevator having a shaft, a transverse shaft journaled in suitable bearings of the frame and provided with flexible connections, a dump connected with the said flexible connections, gearing for connecting the transverse shaft with the shaft of the elevator, a clutch having a movable member for throwing such gearing into and out of operation, a bar connected with the movable member of the clutch and slidable on the dump, and means carried by the dump for engaging the bar, substantially as described.

5. In a grain dump and elevator, the combination of a frame, a dump, hoisting mechanism for raising the dump, gearing connected with the hoisting mechanism and provided with a clutch having a movable member, an operating-bar connected with the movable member and slidable on the dump, and means carried by the dump for engaging the bar, substantially as described.

6. In a grain dump and elevator, the combination of a dump, hoisting mechanism for raising the dump, a clutch connected with the hoisting mechanism, an operating-bar slidable on the dump and arranged to operate the clutch, and adjustable means carried by the dump for engaging and actuating the operating-bar, substantially as described.

7. In a grain dump and elevator, the combination of a dump provided with an adjustable pin, hoisting mechanism, a clutch for throwing the hoisting mechanism out of operation, and an operating device slidable on the dump and arranged in the path of the pin and connected with the clutch, substantially as described.

8. In a grain elevator and dump, the combination of a dump, hoisting mechanism, adjustable means mounted on the dump, a clutch, and an operating device connected with the clutch and arranged in the path of the adjustable means, whereby the hoisting mechanism is stopped when the dump is raised to the desired elevation, substantially as described.

9. In a grain dump and elevator, the combination of a dump, hoisting mechanism, a ratchet-wheel connected with the hoisting mechanism, a pawl normally engaging the ratchet-wheel, a rotary brake element, and means for engaging the rotary brake element and for throwing the pawl out of engagement before the brake element is engaged, substantially as described.

10. In a grain dump and elevator, the combination of a dump, hoisting mechanism, a ratchet-wheel provided with a brake-wheel, a pawl normally engaging the ratchet-wheel, and a lever having a shoe for engaging the brake-wheel and provided with means for throwing the pawl out of engagement with the ratchet-wheel before the brake-wheel is engaged by the shoe, substantially as described.

11. In a grain dump and elevator, the combination of an elevator, a transverse conveyer arranged to swing upward and downward to permit a wagon to pass under it, a flexible connection having a weight and connected with the conveyer for counterbalancing the same and means operable independently of the transverse conveyer for raising and lowering a wagon for dumping the same, substantially as described.

12. In a grain dump and elevator, the combination of a platform having a frame, an elevator extending upward from one side of the platform, a transverse conveyer hingedly mounted and arranged to extend across the platform, a guide located above the conveyer, and a flexible connection passing through the guide and connected with the conveyer and provided with a weight for counterbalancing the same, substantially as described.

In testimony that we claim the foregoing as our own we have hereto affixed our signatures in the presence of two witnesses.

ERNST SCHROEDER.
HENRY V. SCHROEDER.

Witnesses:
   VALENTIN IMIG, Sr.,
   ERNEST C. IMIG.